US012756442B2

(12) United States Patent
Bian et al.

(10) Patent No.: US 12,756,442 B2
(45) Date of Patent: Oct. 6, 2026

(54) INFORMATION TRANSMISSION METHOD AND APPARATUS, COMMUNICATION NODE, AND STORAGE MEDIUM

(71) Applicant: ZTE CORPORATION, Shenzhen (CN)

(72) Inventors: Luanjian Bian, Shenzhen (CN); Bo Dai, Shenzhen (CN); Youjun Hu, Shenzhen (CN); Kun Liu, Shenzhen (CN); Huiying Fang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 325 days.

(21) Appl. No.: 18/560,560

(22) PCT Filed: Feb. 25, 2022

(86) PCT No.: PCT/CN2022/077813
§ 371 (c)(1),
(2) Date: Nov. 13, 2023

(87) PCT Pub. No.: WO2022/237276
PCT Pub. Date: Nov. 17, 2022

(65) Prior Publication Data

US 2024/0250731 A1 Jul. 25, 2024

(30) Foreign Application Priority Data

May 12, 2021 (CN) ......................... 202110519186.1

(51) Int. Cl.
*H04B 7/06* (2006.01)
*H04L 5/00* (2006.01)
(Continued)

(52) U.S. Cl.
CPC ......... *H04B 7/0626* (2013.01); *H04L 5/0051* (2013.01); *H04L 27/26025* (2021.01); *H04W 72/0446* (2013.01); *H04W 72/0457* (2023.01)

(58) Field of Classification Search
CPC ........ H04W 72/12; H04W 24/10; H04B 7/06; H04L 5/00
See application file for complete search history.

(56) References Cited

U.S. PATENT DOCUMENTS

2020/0228282 A1 7/2020 Kwak et al.
2020/0366407 A1 11/2020 Lnu et al.

FOREIGN PATENT DOCUMENTS

CN 110545562 A 12/2019
CN 111865528 A 10/2020
(Continued)

OTHER PUBLICATIONS

International Search Report in Application No. PCT/CN2022/077813, dated May 7, 2022, 4 pages, including translation.
(Continued)

*Primary Examiner* — Melvin C Marcelo
(74) *Attorney, Agent, or Firm* — Morgan, Lewis & Bockius LLP

(57) ABSTRACT

Provided are an information transmission method and apparatus, a communication node, and a storage medium. The information transmission method is applied by a first communication node and includes: determining transmission slots for reference signals on reference bandwidth parts, and sending channel state reporting indication information to a second communication node, where the channel state reporting indication information is used to trigger the second communication node to, based on the reference signals in the transmission slots, report on an uplink physical channel within an active bandwidth part a channel state for the reference bandwidth parts, and the reference bandwidth
(Continued)

parts are inactive bandwidth parts whose channel state the second communication node needs to report.

16 Claims, 2 Drawing Sheets

(51) Int. Cl.

| | |
|---|---|
| ***H04L 27/26*** | (2006.01) |
| ***H04W 72/0446*** | (2023.01) |
| ***H04W 72/0457*** | (2023.01) |

(56) References Cited

FOREIGN PATENT DOCUMENTS

| | | | |
|---|---|---|---|
| WO | 2019165224 | A1 | 8/2019 |
| WO | WO20200027601 | A1 | 2/2020 |
| WO | 2021221491 | A1 | 4/2021 |

OTHER PUBLICATIONS

Extended European Search Report in Application No. 22806253.5, dated Apr. 7, 2025, 10 pages.

INFORMATION TRANSMISSION METHOD AND APPARATUS, COMMUNICATION NODE, AND STORAGE MEDIUM

CROSS REFERENCE TO RELATED APPLICATIONS

This is a National Stage Application, filed under 35 U.S.C. 371, of International Patent Application No. PCT/CN2022/077813, filed on Feb. 25, 2022, which is based on and claims priority to Chinese Patent Application No. 202110519186.1 filed with the China National Intellectual Property Administration (CNIPA) on May 12, 2021, the disclosure of which is incorporated herein by reference in its entirety.

TECHNICAL FIELD

The present application relates to the field of the communication technology, for example, an information transmission method and apparatus, a communication node, and a storage medium.

BACKGROUND

In the existing protocols of new radio (NR) of the 5th generation mobile communication technology, one user equipment (UE) can support multiple bandwidth parts (BWPs).

In the related art, the UE can only measure and report the channel state of a currently active BWP, and thus a base station cannot determine the transmission performance of the UE on different BWPs, which is not conducive to the dynamic scheduling of the UE among BWPs.

SUMMARY

Embodiments of the present application provide an information transmission method and apparatus, a communication node, and a storage medium to facilitate the dynamic scheduling of a second communication node.

In a first aspect, an embodiment of the present application provides an information transmission method. The method is applied by a first communication node and includes the following.

Transmission slots for reference signals on reference BWPs are determined.

Channel state reporting indication information is sent to a second communication node, where the channel state reporting indication information is used to trigger the second communication node to, based on the reference signals in the transmission slots, report on an uplink physical channel within an active BWP a channel state for the reference BWPs.

The reference BWPs are inactive BWPs whose channel state the second communication node needs to report.

In a second aspect, an embodiment of the present application provides an information transmission method. The method is applied by a second communication node and includes the following.

Channel state reporting indication information sent by a first communication node is received, where the channel state reporting indication information is used to trigger the second communication node to report the channel state for reference BWPs.

A transmission slot for a reference signal on the reference BWP is determined.

The reference signal is received in the transmission slot.

The channel state for the reference BWPs is measured based on the reference signal.

The channel state for the reference BWPs is reported on an uplink physical channel within an active BWP.

In a third aspect, an embodiment of the present application provides an information transmission apparatus. The apparatus is configured in a first communication node and includes a determination module and a sending module.

The determination module is configured to determine a transmission slot for a reference signal on a reference BWP.

The sending module is configured to send channel state reporting indication information to a second communication node, where the channel state reporting indication information is used to trigger the second communication node to, based on the reference signals in the transmission slots, report on an uplink physical channel within an active BWP a channel state for the reference BWPs.

The reference BWPs are inactive BWPs whose channel state the second communication node needs to report.

In a fourth aspect, an embodiment of the present application provides an information transmission apparatus. The apparatus is configured in a second communication node and includes a first receiving module, a determination module, a second receiving module, a measurement module, and a reporting module.

The first receiving module is configured to receive channel state reporting indication information sent by a first communication node, where the channel state reporting indication information is used to trigger the second communication node to report the channel state for reference BWPs.

The determination module is configured to determine a transmission slot for a reference signal on the reference BWP.

The second receiving module is configured to receive the reference signals in the transmission slots.

The measurement module is configured to measure, based on the reference signal, the channel state for the reference BWPs.

The reporting module is configured to report the channel state for the reference BWPs on an uplink physical channel within an active BWP.

In a fifth aspect, an embodiment of the present application provides a communication node. The communication node includes one or more processors and a storage apparatus.

The storage apparatus is configured to store one or more programs.

The one or more programs, when executed by the one or more processors, enable the one or more processors to implement the information transmission method provided in the embodiments of the present application.

In a sixth aspect, an embodiment of the present application provides a storage medium. The storage medium is configured to store a computer program, and the computer program, when executed by a processor, implements any information transmission method provided in the embodiments of the present application.

The preceding embodiments and other aspects of the present application and implementations thereof are described in more detail in the description of drawings, detailed description, and claims.

DETAILED DESCRIPTION

To make the objects, solutions, and advantages of the present application more apparent, a detailed description is given hereinafter to illustrate embodiments of the present application in conjunction with drawings. It is to be noted that if not in collision, the embodiments and features therein in the present application may be combined with each other.

The steps illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from those described herein.

Figure 1:
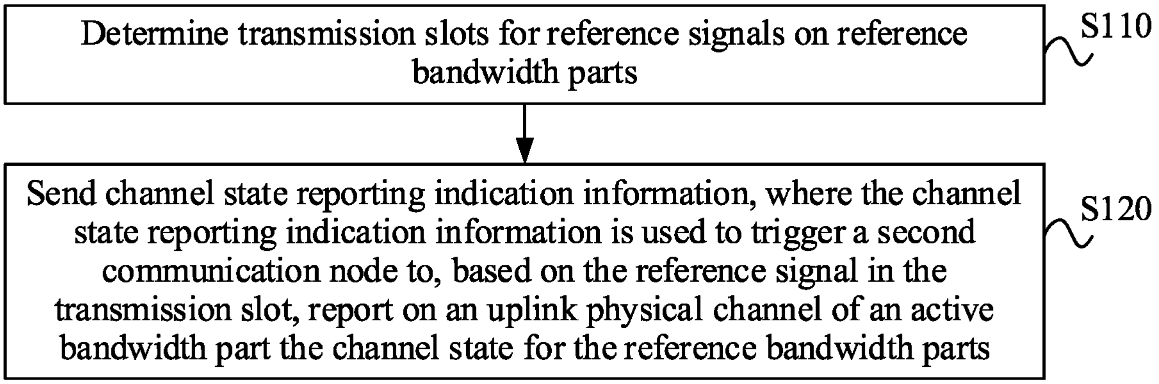
FIG. 1 is a flowchart of an information transmission method according to an embodiment of the present application.

In an example implementation, FIG. 1 is a flowchart of an information transmission method according to an embodiment of the present application. This method is applicable to the case of determining the transmission performance of a second communication node on different BWPs. This method may be executed by an information transmission apparatus provided by the present application, and the apparatus may be implemented by software and/or hardware and integrated into a first communication node. The first communication node may be considered as a base station.

As shown in FIG. 1, the information transmission method provided in this embodiment of the present application includes the following operations.

In S110, transmission slots for reference signals on reference BWPs are determined.

In this embodiment of the present application, the reference BWPs are inactive BWPs whose channel state the second communication node needs to report. The number of reference BWPs is not limited herein, and the inactive BWPs which are to be determined as reference BWPs are not limited herein.

The first communication node may transmit the reference signals in the transmission slots, and the second communication node may receive the reference signals in the transmission slots.

In this step, the transmission slot for the reference signal on the reference BWP is determined to facilitate instructing the second communication node to measure the channel state for the reference BWPs, thereby determining the transmission performance of the second communication node on different BWPs.

In S120, channel state reporting indication information is sent to a second communication node, where the channel state reporting indication information is used to trigger the second communication node to, based on the reference signals in the transmission slots, report on an uplink physical channel within an active BWP a channel state for the reference BWPs.

The active BWP is a BWP occupied by the second communication node for sending and receiving physical channel data. The physical channel includes a physical uplink shared channel, a physical downlink shared channel, a physical uplink control channel, and a physical downlink control channel. The active BWP and the reference BWP may be in the same carrier.

After the transmission slot is determined, the first communication node may send the channel state reporting indication information. The channel state reporting indication information may indicate the transmission slot for the reference signal on the reference BWP so that the second communication node determines the transmission slot, receives the reference signals in the transmission slots, and thus measures the channel state for the reference BWPs.

The second communication node may report the channel state for the reference BWPs to the first communication node on the uplink physical channel of the active BWP.

In this embodiment, after the channel state reporting indication information is sent, the channel state for the reference BWPs reported by the second communication node may be received, thereby dynamically scheduling the second communication node in the reference BWP based on the channel state for the reference BWPs.

In the information transmission method provided in this embodiment of the present application, transmission slots for reference signals on reference BWPs are determined, and channel state reporting indication information is sent, where the channel state reporting indication information is used to trigger the second communication node to, based on the reference signals in the transmission slots, report on an uplink physical channel within an active BWP a channel state for the reference BWPs, the active BWP is a BWP occupied by the second communication node for sending and receiving physical channel data, and the reference BWPs are inactive BWPs whose channel state the second communication node needs to report. Through the method, the first communication node can trigger the second communication node to report the channel state for the reference BWPs by sending the channel state reporting indication information, thereby facilitating the first communication node dynamically scheduling the second communication node.

Based on the preceding embodiment, variant embodiments of the preceding embodiment are provided. It is to be noted here that for ease of description, only differences from the preceding embodiment are described in the variant embodiments.

In an embodiment, the channel state reporting indication information includes at least one of the following: a reference signal transmission delay, a channel state reporting delay, a channel state reporting period, a channel state reporting slot offset, identification information of the reference BWP or a channel state reporting mode.

The channel state reporting mode includes: indicating whether the channel state reporting is subband reporting or wideband reporting.

In an embodiment, the step where the transmission slot for the reference signal on the reference BWP is determined includes the following operations.

The transmission slot for the reference signal on the reference BWP is determined according to the reference signal transmission delay, a slot index of the active BWP, a subcarrier spacing of the reference BWP, and a subcarrier spacing of the active BWP.

The reference signal transmission delay may be one slot offset value, and the slot offset value is the number of slots representing the reference signal transmission delay.

In an embodiment, in a case where a reference signal transmission delay on the reference BWP is $k_\Delta$ slots, a transmission slot index of the reference signal on the reference BWP is equal to $$\left\lceil \frac{\mu'}{\mu} \cdot k_0 \right\rceil + k_\Delta,$$

where μ' denotes the subcarrier spacing of the reference BWP, μ denotes the subcarrier spacing of the active BWP, and $k_0$ denotes a slot index on the active BWP, and reference signal delay information is sent on the slot $k_0$.

In an embodiment, the reference signal delay information is also used for: indicating reference signal transmission delays on N reference BWPs through N*P bits.

In this embodiment, the reference signal delay information includes the reference signal transmission delay, and the reference signal transmission delays on N reference BWPs may be indicated through N*P bits.

In an embodiment, every P bits in the N*P bits from low-order bits to high-order bits indicate a reference signal transmission delay on one reference BWP, and the N*P bits indicate the N reference BWPs in descending order of BWP identifications (IDs).

In an embodiment, the configuration of the reference signal is determined by a higher-layer configuration parameter, and the configuration of the reference signal includes at least one of the following: a reference signal identification (RSID), a period, a slot offset, a resource mapping pattern, a power offset, quasi co-location (QCL) information or a reference signal scrambling identification (SCID).

In an embodiment, a resource mapping pattern of the reference signal on the reference BWP is the same as the resource mapping pattern of a reference signal of the second communication node on the active BWP.

In an embodiment, a reference signal on a reference BWP having a reference BWP index m is configured using one of the following configurations: a reference signal configuration on the active BWP or a reference signal configuration on a reference BWP having a reference BWP index n, where n=0, 1, . . . , and N−1, n≠m, and N is the number of reference BWPs.

In an embodiment, in a case where a channel state reporting configuration of the reference BWP is periodic reporting, a reporting period is greater than or equal to the largest reference signal transmission period among reference BWPs.

In an embodiment, the method further includes the following operation.

Reference BWP range information is sent, where the reference BWP range information indicates BWP IDs included in the reference BWPs.

Figure 2:
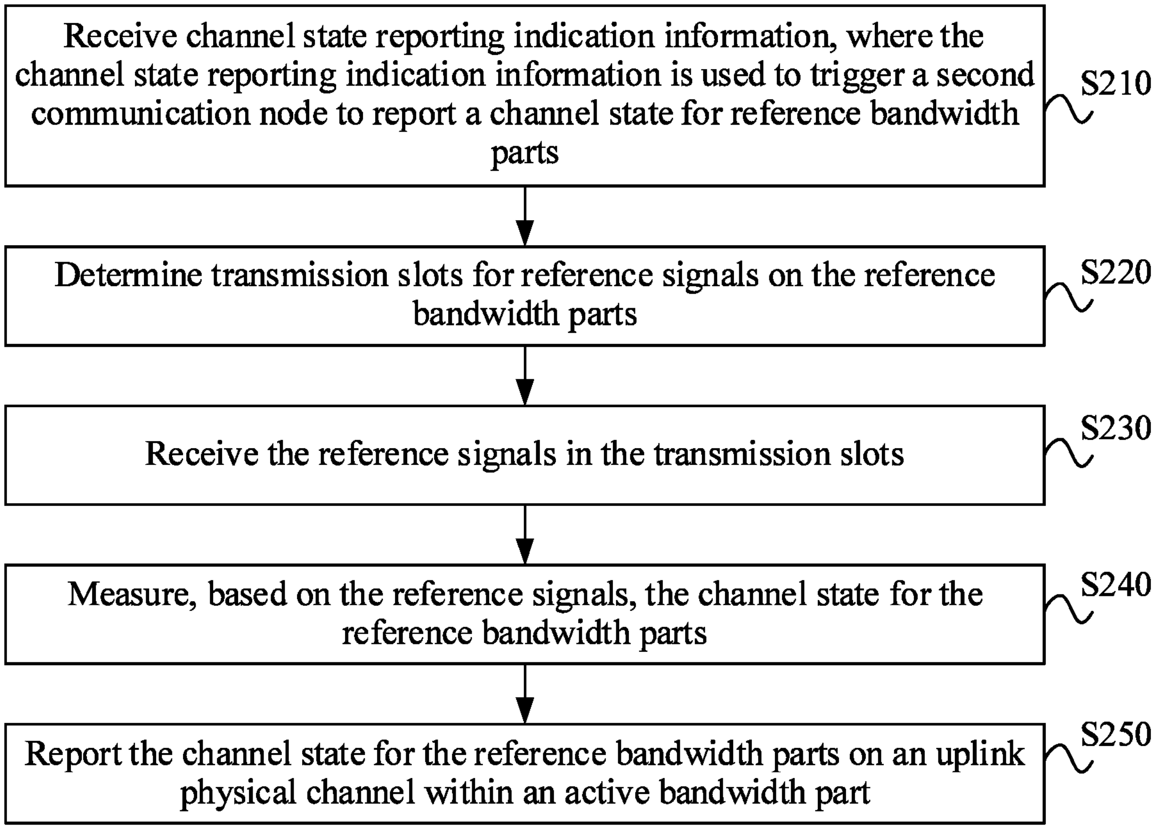
FIG. 2 is a flowchart of another information transmission method according to an embodiment of the present application.

In an example implementation, the present application further provides an information transmission method. FIG. 2 is a flowchart of another information transmission method according to an embodiment of the present application. This method is applicable to the case of determining the transmission performance of a second communication node on different BWPs. This method may be executed by an information transmission apparatus provided by the present application, and the apparatus may be implemented by software and/or hardware and integrated into the second communication node. The second communication node may be a UE. For the content that is not yet exhaustive in this embodiment, reference may be made to the preceding embodiments, and the details are not repeated here.

As shown in FIG. 2, the information transmission method provided in this embodiment of the present application includes the following operations.

In S210, channel state reporting indication information is received, where the channel state reporting indication information is used to trigger the second communication node to report the channel state for reference BWPs.

The second communication node may receive the channel state reporting indication information sent by a first communication node to, based on reference signals in transmission slots, report on an uplink physical channel within an active BWP the channel state for the reference BWPs.

In S220, transmission slots for reference signals on the reference BWPs are determined.

In this embodiment, the transmission slots may be determined based on the channel state reporting indication information. The means of determination is not limited herein. For example, the channel state reporting indication information is parsed to acquire the transmission slots included in the channel state reporting indication information. For another example, the second communication node acquires the transmission slots for the BWPs in advance, and the second communication node may determine the corresponding transmission slots based on the identification information included in the channel state reporting indication information. The identification information may be identification information identifying the reference signal on the reference BWP, identification information identifying the transmission slot, or identification information identifying the reference BWP.

In the case of determining the transmission slots, the transmission slots may also be determined in conjunction with a reference signal transmission delay, and the way to acquire the reference signal transmission delay is not limited here.

In S230, the reference signals are received in the transmission slots.

After the transmission slots are determined, in this step, the reference signals may be received in the transmission slots to facilitate the measurement of the channel state of the corresponding reference BWP.

In S240, the channel state for the reference BWPs is measured based on the reference signal.

The way to measure the channel state for the reference BWPs based on the reference signal is not limited herein, as long as the channel state for the reference BWPs can be determined based on the reference signal.

In S250, the channel state for the reference BWPs is reported on an uplink physical channel within an active BWP.

After the channel state is determined, in this step, the channel state may be reported to the first communication node to facilitate the scheduling of the second communication node.

In the information transmission method provided in this embodiment of the present application, channel state reporting indication information is received, where the channel state reporting indication information is used to trigger the second communication node to report the channel state for reference BWPs; transmission slots for reference signals on the reference BWPs are determined; the reference signals are received in the transmission slot; the channel state for the reference BWPs is measured based on the reference signal; and the channel state for the reference BWPs is reported on an uplink physical channel within an active BWP. Through the method, the first communication node is effectively enabled to determine the channel state for the reference BWPs, thereby facilitating the first communication node performing scheduling on different BWPs.

Based on the preceding embodiments, variant embodiments of the preceding embodiments are provided. It is to be noted here that for ease of description, only differences from the preceding embodiments are described in the variant embodiments.

In an embodiment, the channel state reporting indication information includes one of the following: a reference signal transmission delay, a channel state reporting delay, a channel state reporting period, a channel state reporting slot offset or identification information of the reference BWP.

In an embodiment, the step where the transmission slot for the reference signal on the reference BWP is determined includes the following operations.

The transmission slot for the reference signal on the reference BWP is determined according to the reference signal transmission delay, a slot index of the active BWP, a subcarrier spacing of the reference BWP, and a subcarrier spacing of the active BWP.

The reference signal transmission delay may be one slot offset value, and the slot offset value is the number of slots representing the reference signal transmission delay.

In an embodiment, in a case where a reference signal transmission delay on the reference BWP is $k_\Delta$ slots, a transmission slot index of the reference signal is determined to be $$\left\lceil \frac{\mu'}{\mu} \cdot k_0 \right\rceil + k_\Delta,$$

where μ' denotes the subcarrier spacing of the reference BWP, μ denotes the subcarrier spacing of the active BWP, and $k_0$ denotes a slot index on the active BWP, and reference signal delay information is sent on the slot $k_0$.

In an embodiment, before the reference signal is received in the transmission slot, the configuration of the reference signal is determined according to a higher-layer configuration parameter, where the configuration of the reference signal includes at least one of the following: an RSID, a period, a slot offset, a resource mapping pattern, a power offset, QCL information or a reference signal SCID.

Before the reference signal is received, in this embodiment, the configuration of the reference signal may be determined first, and the reference signal is received based on the configuration of the reference signal.

In an embodiment, a resource mapping pattern of the reference signal on the reference BWP is the same as the resource mapping pattern of a reference signal of the second communication node on the active BWP.

In an embodiment, a reference signal on a reference BWP having a reference BWP index m is configured using one of the following configurations: a reference signal configuration on the active BWP or a reference signal configuration on a reference BWP having a reference BWP index n, where n=0, 1, . . . , and N−1, n≠m, and N is the number of reference BWPs.

In an embodiment, in a case where the second communication node switches from the active BWP to the reference BWP to receive the reference signal, a time interval exists between the last orthogonal frequency-division multiplexing (OFDM) symbol occupied by a physical channel or physical signal configured for the second communication node on the active BWP and the first OFDM symbol occupied by the reference signal on the reference BWP.

In an embodiment, the time interval is greater than or equal to L OFDM symbols, where the value of L is determined according to a subcarrier spacing of a target BWP switched to.

The way to determine the value of L based on the subcarrier spacing is not limited herein, for example, the value of L may be determined based on values before and after the switch of the subcarrier spacing.

In an embodiment, the value of L is determined according to the subcarrier spacing of the target BWP switched to and in the following manner: L=A·S/P, where S represents the subcarrier spacing of the target BWP switched to, P represents the subcarrier spacing of the active BWP before the target BWP is switched to, and A is greater than or equal to 1.

For example, the subcarrier spacing of the active BWP before the target BWP is switched to is P, and in a case where the subcarrier spacing of the target BWP is switched to is also P, L=A; and in a case where the subcarrier spacing of the target BWP is switched to is S, L=A·S/P, where A is greater than or equal to 1. For example, the subcarrier spacing of the active BWP before the target BWP is switched to is 15 kHz, and in a case where the subcarrier spacing of the target BWP is switched to is 15 kHz, L=A; in a case where the subcarrier spacing of the target BWP is switched to is 30 kHz, L=2A; and in a case where the subcarrier spacing of the target BWP is switched to is 60 kHz, L=4A.

In an embodiment, the method further includes the following operations.

Identification information of an optimal BWP and a channel state of the optimal BWP are reported.

The optimal BWP is a BWP having an optimal channel state among all reference BWPs; or the optimal BWP is a BWP having an optimal channel state among the reference BWP and the active BWP.

In an embodiment, the method further includes: acquiring reference BWP range information.

The following is the exemplary description of the present application. The information transmission method provided by the present application may be considered a multi-BWP channel state reporting method. In the existing standard protocols of the 5G NR, one UE supports up to four downlink BWPs, and each BWP may have different bandwidths, subcarrier spacings, cyclic prefixes, and frequency domain locations. For a single carrier, one UE can only work on one active downlink BWP at one occasion. A base station can assign and switch the BWP on which the UE works according to the traffic requirements, thereby improving network flexibility. For example, when the data traffic demand of the UE decreases, the base station may switch the UE to a BWP with a smaller bandwidth to reduce the power consumption of the UE; when the time frequency resources of the BWP on which the UE is working are in short supply, the base station may switch the UE to a relatively idle BWP; when the BWP on which the UE is working suffers from serious frequency selective fading or neighbor interference, the base station may switch the UE to another BWP; and in addition, new enhancement technologies may also be applied to specific BWPs to ensure the forward compatibility of the network. In the related art, the UE can only measure and report the channel state of a currently active BWP, and thus the base station cannot determine the transmission performance of the UE on different BWPs, which is not conducive to the dynamic scheduling of the UE among BWPs.

In this regard, the present application proposes a multi-BWP channel state reporting method so that the UE can measure the channel states of multiple BWPs and report the measured channel states to the base station, and in this manner, the base station can switch BWPs for the UE according to the scenario requirements, thereby improving spectrum utilization efficiency and reducing interference.

Embodiment One

A multi-BWP channel state reporting method, that is, an information transmission method, is provided, and the method is applied by the first communication node (a sending terminal).

Step 1: The first communication node determines a transmission slot for a reference signal on a reference BWP.

Step 2: Channel state reporting indication information is sent, where the channel state reporting indication information is used to trigger the second communication node to, based on the reference signal in the transmission slot, report on an uplink physical channel within an active BWP a channel state for reference BWPs.

The active BWP is a BWP occupied by the second communication node for sending and receiving physical channel data, and the reference BWP is an inactive BWP whose channel state the second communication node needs to report.

The physical channel includes a physical uplink shared channel, a physical downlink shared channel, a physical uplink control channel, and a physical downlink control channel.

In this embodiment, the reference BWP includes one or more BWPs.

In this embodiment, the active BWP and the reference BWP are BWPs in the same carrier.

The channel state includes at least one of the following: a channel state information-reference signal resource indication (CRI), a channel quality indication (CQI), a precoding matrix indication (PMI), a rank indication (RI), reference signal received power (RSRP), an interference power level or a BWP indication. The BWP indication includes: an ID of a BWP having an optimal channel state among reference BWPs or an ID of a BWP having an optimal channel state among the reference BWP and the active BWP.

In this embodiment, the channel state reporting indication information includes at least one of the following: a reference signal transmission delay, a channel state reporting delay, a channel state reporting period, a channel state reporting slot offset or identification information of the reference BWP. The first communication node sends the channel state reporting indication information and indirectly is used to trigger the reporting of the channel state for the reference BWPs.

In an embodiment, the reference signal transmission delay is sent through downlink control information (DCI) or media access control (MAC) information.

In an embodiment, in this embodiment, the channel state reporting delay is sent through DCI or MAC information.

In an embodiment, the channel state reporting period and the channel state reporting slot offset are sent through radio resource control (RRC) information to notify the second communication node of the periodically reported channel state for the reference BWPs and the periodically reported slot index. Since the channel state for the reference BWPs is reported on the uplink physical channel of the active BWP, the reported slot index is the slot index on the active BWP.

In an embodiment, the reference BWP ID information indicates IDs of BWPs that need to be measured for the current trigger, that is, which BWPs to be measured for the current trigger. The reference BWP ID information is sent through DCI or MAC information.

In an embodiment, the channel state reporting indication information further includes 1-bit reference BWP channel state reporting trigger information indicating whether the channel state for the reference BWPs needs to be reported.

In this embodiment, the first communication node sends reference signal delay information, and the reference signal delay information is configured for indicating a reference signal transmission delay on the reference BWP. The transmission slot for the reference signal on the reference BWP can be determined according to the delay information. The method is mainly used in the case where the reference signal on the reference BWP adopts a non-periodic signal, and since the second communication node is not able to determine the transmission slot for the reference signal on the reference BWP, the first communication node is required to send the delay information of the reference signal.

In an embodiment, assuming that the reference signal transmission delay on the reference BWP is $k_\Delta$ slots, a transmission slot index of the reference signal on the reference BWP is equal to $$\left\lceil \frac{\mu'}{\mu} \cdot k_0 \right\rceil + k_\Delta,$$

where μ' denotes a subcarrier spacing of the reference BWP, μ denotes a subcarrier spacing of the active BWP, and $k_0$ denotes a slot index on the active BWP, and the reference signal delay information is sent on the slot $k_0$.

In this embodiment, the reference signal delay information further includes: indicating reference signal transmission delays on N reference BWPs using N*P bits. Every P bits in the N*P bits from low-order bits to high-order bits indicate a reference signal transmission delay on one reference BWP, and the N*P bits indicate the N reference BWPs in descending order of BWP IDs.

When one reference BWP is to be measured, the reference signal transmission delay on the reference BWP is indicated by P bits; when two reference BWPs are to be measured, the reference signal transmission delays on the two reference BWPs are indicated by 2P bits, where P low-order bits are for the smaller reference BWP ID, and P high-order bits are for the larger reference BWP ID; when N reference BWPs are to be measured, the reference signal transmission delays on the N reference BWPs are indicated by N*P bits, where P lowest-order bits are for the smallest reference BWP ID, and P highest-order bits are for the largest reference BWP ID.

In this embodiment, in a case where the reference signal on the reference BWP is a periodic signal, the first communication node sends a transmission period and a slot offset of the reference signal and can determine the transmission slot for the reference signal according to the transmission period and the slot offset.

In an embodiment, the first communication node sends the channel state reporting delay information to indicate the number of slots delayed by the reporting of the channel state for the reference BWPs and then determines the slot index for the reporting of the channel state. The method is mainly used in the case where the reference signal on the reference BWP adopts a periodic signal, and since the second communication node can determine the transmission slot for the reference signal through the transmission period and slot offset of the reference signal, the first communication node instructs the second communication node on which slot of the active BWP the channel state for the reference BWPs is to be reported.

In this embodiment, the second communication node needs to know the configuration of the reference signal on the reference BWP to receive the reference signal according to the configuration, and for this purpose, the configuration of the reference signal on the reference BWP is determined using the following three optional methods.

Method One: The configuration of the reference signal on the reference BWP is determined by a higher-layer configuration parameter. The configuration of the reference signal includes at least one of the following: an RSID, a period, a slot offset, a resource mapping pattern (the number of ports, a density, and a code-division multiplexing type (CDM-type)), a power offset, a QCL configuration or a reference signal SCID.

Method Two: The resource mapping pattern of the reference signal on the reference BWP is configured by default to be the same as the resource mapping pattern of a reference signal of the second communication node on the active BWP. In addition, the reference signal on the reference BWP is also configured by default to use the same power offset, QCL, and reference signal SCID as the reference signal of the second communication node on the active BWP. In this manner, the second communication node does not need to be notified of the reference signal configuration information related to the reference BWP.

Method three: The reference signal on a reference BWP having a reference BWP index m uses one of the following configurations: a reference signal configuration on the active BWP or a reference signal configuration on a reference BWP having a reference BWP index n, where n=0, 1, . . . , and N−1, n≠m, and N is the number of reference BWPs.

Illustratively, the first communication node sends indication information A, and the indication information A indicates which of the preceding configurations is used for the reference signal of the reference BWP index m. The configuration of the reference signal includes at least one of the following: an RSID, a period, a slot offset, a resource mapping pattern, a power offset, a QCL configuration or a reference signal SCID.

In this embodiment, the resource mapping pattern represents a mapping location of the reference signal on a time-frequency resource. The parameters of the resource mapping pattern include: the number of ports, a density, and a CDM-type of the reference signal.

In this embodiment, in a case where a channel state reporting configuration of the reference BWP is periodic reporting, a reporting period is greater than or equal to the largest reference signal transmission period among reference BWPs.

Illustratively, among reference BWPs, the largest reference signal transmission period is T, and then the reporting period of the channel state for the reference BWPs is greater than or equal to T. For example, when the reporting period of the channel state of a first reference BWP is T1, the reporting period of the channel state of a second reference BWP is T2, and T1>T2, the reporting period of the channel state for the reference BWPs is greater than or equal to T2.

In an embodiment, the first communication node sends reference BWP range information, and the reference BWP range information is used to indicate BWP IDs in the reference BWPs. Illustratively, the first communication node sends a higher-layer configuration parameter to indicate which BWPs are reference BWPs.

In this embodiment, the BWP index corresponds to a BWP ID.

In this embodiment, the reference signal may be a zero power resource element (RE). The reference signal includes: a non-zero power reference signal, a zero power reference signal, and a channel state information-interference measurement (CSI-IM) signal.

Embodiment Two

A multi-BWP channel state reporting method is provided. The method is applied by the second communication node (a receiving terminal).

Step 1: The second communication node receives channel state reporting indication information, where the channel state reporting indication information is used to trigger the second communication node to report the channel state for a reference BWP.

Step 2: A transmission slot for a reference signal on the reference BWP is determined.

Step 3: The reference signal is received in the transmission slot.

Step 4: The channel state for the reference BWPs is measured based on the reference signal.

Step 5: The channel state for the reference BWPs is reported on an uplink physical channel within an active BWP.

In this embodiment, the channel state includes at least one of the following: a CRI, a CQI, a PMI, an RI, an RSRP, an interference power level or a BWP indication. The BWP indication includes an ID of a BWP having an optimal channel state.

The active BWP is a BWP occupied by the second communication node for sending and receiving physical channel data, and the reference BWPs are inactive BWPs whose channel state the second communication node needs to report. The physical channel includes a physical uplink shared channel, a physical downlink shared channel, a physical uplink control channel, and a physical downlink control channel.

In this embodiment, the reference BWP includes one or more BWPs.

In this embodiment, the active BWP and the reference BWP are BWPs in the same carrier.

In this embodiment, the channel state reporting indication information includes at least one of the following: a reference signal transmission delay, a channel state reporting delay, a channel state reporting period, a channel state reporting slot offset or identification information of the reference BWP.

After the second communication node receives the channel state reporting indication information, the measurement and reporting of the channel state for the reference BWPs are triggered.

In an embodiment, the reference signal transmission delay is DCI or MAC information.

In an embodiment, the channel state reporting delay is DCI or MAC information. The second communication node determines a slot index for the reporting of the reference BWP channel state based on the channel state reporting delay.

In an embodiment, the channel state reporting period and the channel state reporting slot offset are RRC information.

The second communication node determines a period and a slot offset for the reporting of the channel state for the reference BWPs based on this information and determines a slot index on the active bandwidth part based on the reporting period and the slot offset.

In an embodiment, the reference BWP ID information indicates IDs of BWPs that need to be measured for the current trigger. After the second communication node receives the BWP ID indication of the BWP that needs to be measured, the second communication node determines which BWPs need to be measured for the current trigger. The reference BWP ID information is DCI or MAC information.

In this embodiment, the second communication node receives reference signal delay information and determines the transmission slot for the reference signal on the reference BWP according to the reference signal delay information.

In an embodiment, in a case where the reference signal transmission delay on the reference BWP is $k_\Delta$ slots, the second communication node determines a transmission slot index of the reference signal on the reference BWP to be equal to $$\left\lceil \frac{\mu'}{\mu} \cdot k_0 \right\rceil + k_\Delta,$$

where μ' denotes a subcarrier spacing of the reference BWP, μ denotes a subcarrier spacing of the active BWP, and $k_0$ denotes a slot index on the active BWP, and the reference signal delay information is sent on the slot $k_0$.

In this embodiment, the second communication node receives the reference signal delay information and determines the reference signal transmission delays on N reference BWPs. In the reference signal delay information, the reference signal transmission delays on the N reference BWPs are indicated by N*P bits, where the reference signal transmission delay on a reference BWP with the smallest ID is determined according to P lowest-order bits, and the reference signal transmission delay on a reference BWP with the largest ID is determined according to P highest-order bits.

In this embodiment, in a case where the reference signal on the reference BWP is a periodic signal, the second communication node receives a transmission period and a slot offset of the reference signal and determines the transmission slot for the reference signal according to the transmission period and the slot offset.

In an embodiment, the second communication node receives the channel state reporting delay information and determines the slot index for the reporting of the channel state according to the channel state reporting delay information.

In this embodiment, in order to receive the reference signal of the reference BWP, the second communication node needs to determine the configuration of the reference signal.

In this embodiment, the second communication node receives a higher-layer configuration parameter sent by the first communication node and determines the configuration of the reference signal according to the higher-layer configuration parameter, where the configuration of the reference signal includes at least one of the following: an RSID, a period, a slot offset, a resource mapping pattern, a power offset, QCL information or a reference signal SCID.

In this embodiment, the second communication node determines the resource mapping pattern of the reference signal on the reference BWP to be the same as the resource mapping pattern of a reference signal of the second communication node on the active BWP. In addition, the second communication node also determines the reference signal on the reference BWP to use the same power offset, QCL, and reference signal SCID as the reference signal of the second communication node on the active BWP. For example, after the second communication node receives trigger information for the reporting of the reference BWP channel state, the second communication node assumes that the reference signal on the reference BWP uses the preceding default configuration.

In this embodiment, the reference signal on a reference BWP having a reference BWP index m uses one of the following configurations: a reference signal configuration on the active BWP or a reference signal configuration on a reference BWP having a reference BWP index n, where n=0, 1, . . . , and N−1, n≠m, and N is the number of reference BWPs. For example, the second communication node receives indication information A sent by the first communication node, and according to the indication information A, the second communication node determines which of the preceding reference signal configurations is used for the reference signal of the reference BWP index m. The configuration of the reference signal includes at least one of the following: an RSID, a period, a slot offset, a resource mapping pattern, a power offset, a QCL configuration or a reference signal SCID.

In this embodiment, when the second communication node switches among different reference BWPs to receive the reference signal or switches between the reference BWP and the active BWP, a time interval exists. This time interval reserves the time required for the second communication node to switch between BWPs, and during the time interval, the second communication node does not receive any physical channel or signal.

In this embodiment, when the second communication node switches from the active BWP to the reference BWP to receive the reference signal, a time interval exists between the last OFDM symbol occupied by a physical channel or physical signal configured for the second communication node on the active BWP and the first OFDM symbol occupied by the reference signal on the reference BWP.

In this embodiment, when the second communication node receives the reference signal on the reference BWP and then switches back to the active BWP, a time interval exists between the last OFDM symbol occupied by the reference signal on the reference BWP and the first OFDM symbol occupied by the physical channel or physical signal configured for the second communication node on the active BWP.

In this embodiment, when the second communication node switches from a first reference BWP to a second reference BWP to receive the reference signal, one time interval exists between the last OFDM symbol occupied by the reference signal on the first reference BWP and the first OFDM symbol occupied by the reference signal on the second reference BWP.

In this embodiment, the time interval is greater than or equal to L OFDM symbols, where the value of L is determined according to a subcarrier spacing of a target BWP switched to. The target BWP switched to represents the BWP to which the second communication node switches.

In this embodiment, the value of L is determined according to the subcarrier spacing of the target BWP switched to, and illustratively, in a case where the subcarrier spacing is S, A is the value of L in a case where the subcarrier spacing is P.

Illustratively, in a case where the subcarrier spacing of the target BWP switched to is 15 kilohertz (KHz) and assuming that L=a, in a case where the subcarrier spacing of the target BWP switched to is S KHz, L=a*S/15.

In this embodiment, the second communication node reports the index of an optimal BWP and the channel state of the optimal BWP, that is, the second communication node reports the identification information of the optimal BWP and the channel state of the optimal BWP. Illustratively, the second communication node receives reference signals of reference BWPs, measures the channel states of the reference BWPs, and reports the BWP having the optimal channel state among the reference BWPs as well as the optimal channel state to the first communication node. Alternatively, the second communication node receives a reference signal of a reference BWP and a reference signal of an active BWP, measures the channel state for the reference BWPs and the channel state of the active BWP, and reports the BWP having the optimal channel state among the reference BWP and the active BWP as well as the optimal channel state to the first communication node.

In this embodiment, the second communication node reports the channel state of each reference BWP. Illustratively, the second communication node receives reference signals of reference BWPs, measures the channel states of the reference BWPs, and reports the channel state of each reference BWP and the BWP index corresponding to the channel state within a transmission slot on one uplink physical channel within an active BWP. Alternatively, each time the second communication node receives a reference signal of one reference BWP, the second communication node measures the channel states of the reference BWP and reports the channel state for the reference BWPs and the BWP index within a transmission slot on one uplink physical channel within an active BWP.

In this embodiment, the BWP index corresponds to a BWP ID.

Specific Embodiment One

Step 1: The first communication node determines transmission slots for reference signals on N reference BWPs.

Step 2: Channel state reporting indication information is sent, where the channel state reporting indication information is used to trigger the second communication node to, based on the reference signals in the transmission slots on the N reference BWPs, report on an uplink physical channel within an active BWP the channel states of the reference BWPs.

In this embodiment, the active BWP is a BWP occupied by the second communication node for sending and receiving physical channel data, and the reference BWPs are inactive BWPs whose channel state the second communication node needs to report. For the N reference BWPs, N is greater than or equal to 1.

In this embodiment, IDs of reference BWPs are configured through a higher-layer configuration parameter, that is, the BWPs that are the reference BWPs are configured through the higher-layer configuration parameter.

In this embodiment, the channel state includes at least one of the following: a CRI, a CQI, a PMI, an RI, an RSRP, an interference power level or a BWP indication. The BWP indication includes an ID of a BWP having an optimal channel state.

In this embodiment, the channel state reporting indication information may directly and indirectly trigger the reporting of the channel state of the reference signal, and the channel state reporting indication information includes a reference signal transmission delay. After the first communication node sends the reference signal transmission delay, the first communication node indirectly instructs the second communication node to measure the channel states of the N reference BWPs and report the channel states of the reference BWPs.

In this embodiment, the first communication node sends reference signal delay information and indicates the reference signal transmission delays on the N reference BWPs using N*P bits. Every P bits in the N*P bits from low-order bits to high-order bits indicate a reference signal transmission delay on one reference BWP, and the N*P bits indicate the N reference BWPs in descending order of BWP IDs. When N=3, the first to P-th bits indicate a reference signal transmission delay on a reference BWP with the smallest BWP ID among the reference BWPs, the (P+1)-th to 2P-th bits indicate a reference signal transmission delay on a reference BWP with the second smallest BWP ID, and the (2P+1)-th to 3P-th bits indicate a reference signal transmission delay on a reference BWP with the largest BWP ID.

In this embodiment, assuming that the reference signal transmission delay on the reference BWP is $k_\Delta$ slots, a transmission slot index of the reference signal on the reference BWP is equal to $$\left\lceil \frac{\mu'}{\mu} \cdot k_0 \right\rceil + k_\Delta,$$

where μ' denotes a subcarrier spacing of the reference BWP, μ denotes a subcarrier spacing of the active BWP, and $k_0$ denotes a slot index on the active BWP, and the reference signal delay information is sent on the slot $k_0$.

The reference signal transmission delays of different reference BWPs are related to the subcarrier spacings of the reference BWPs, and the smaller the subcarrier spacing is, the larger the maximum value of $k_\Delta$ is. Therefore, among the N*P bits, the range of $k_\Delta$ indicated by every P bits is related to the subcarrier spacing. For the subcarrier spacings of 15 KHz, 30 KHz, 60 KHz, 120 KHz, and 240 KHz, the value of $k_\Delta$ for the reference BWP with the subcarrier spacing of 15 KHz has the smallest lower and upper limits, and for the reference BWPs with the rest of the subcarrier spacings, the lower and upper limits of the value of corresponding $k_\Delta$ increase as the subcarrier spacing increases.

In this embodiment, the first communication node configures by default the reference signal on the reference BWP and the reference signal of the second communication node on the active BWP to use the same resource mapping pattern, power offset, QCL, and reference signal SCID. In this manner, the second communication node does not need to be notified of the reference signal configuration information related to the reference BWP.

In this embodiment, the reference signal may be a zero power RE. The reference signal includes: a non-zero power channel state information reference signal (NZP-CSI-RS), a zero power channel state information reference signal (ZP-CSI-RS), and a CSI-IM signal.

Specific Embodiment Two

Step 1: A transmission slot for a reference signal on a reference BWP is determined.

Step 2: Trigger state information is sent, where the trigger state information is used to trigger the second communication node to, based on the reference signals in the transmission slots of the reference BWP, report on an uplink physical channel within an active BWP a channel state for the reference BWPs.

In this embodiment, the trigger state information indicates a trigger state index, and one trigger state index corresponds to one channel state reporting configuration and one reference signal configuration.

In this embodiment, the first communication node sends the trigger state information and indirectly indicates the channel state reporting configuration and the reference signal configuration of the reference BWP.

In this embodiment, the trigger state information may indicate M trigger state indexes, and the M trigger state indexes indirectly indicate the channel state reporting configurations and the reference signal configurations of M reference BWPs, where M is greater than or equal to 1.

The channel state reporting configuration includes at least one of the following: whether the channel state reporting is wideband reporting or subband reporting, a precoding codebook type used for the channel state reporting or a reporting content of the channel state reporting. The reference signal configuration includes at least one of the following: an RSID, a period, a slot offset, a resource mapping pattern, a power offset, a QCL configuration or a reference signal SCID.

In this embodiment, the trigger state information is sent through DCI or MAC information.

In a specific embodiment, the first communication node sends reference signal delay information. The second communication node determines a transmission slot for the reference signal on the reference BWP according to the reference signal delay information.

In this embodiment, the channel state includes at least one of the following: a CRI, a CQI, a PMI, an RI, an RSRP, an interference power level or a BWP indication. The BWP indication includes an ID of a BWP having an optimal channel state.

The active BWP is a BWP occupied by the second communication node for sending and receiving physical channel data, and the reference BWPs are inactive BWPs whose channel state the second communication node needs to report. The reference BWP includes one or more BWPs.

In this embodiment, the active BWP and the reference BWP are BWPs in the same carrier.

Specific Embodiment Three

A multi-BWP channel state reporting method is provided. The method is applied by the second communication node (a receiving terminal).

Step 1: The second communication node receives trigger state information.

Step 2: A reference signal on a reference BWP is received according to the trigger state information.

Step 3: The channel state for the reference BWPs is measured based on the reference signal.

Step 4: The channel state for the reference BWPs is reported on an uplink physical channel within an active BWP.

In this embodiment, the second communication node sends the trigger state information and determines a channel state reporting configuration and a reference signal configuration of the reference BWP according to the trigger state information.

The channel state reporting configuration includes at least one of the following: whether the channel state reporting is wideband reporting or subband reporting, a precoding codebook type used for the channel state reporting or a reporting content of the channel state reporting. The reference signal configuration includes at least one of the following: an RSID, a period, a slot offset, a resource mapping pattern (the number of ports and a density), a power offset, a QCL configuration or a reference signal SCID.

In this embodiment, the second communication node receives reference signal delay information. A transmission slot for the reference signal on the reference BWP is determined according to the reference signal delay information.

In this embodiment, the channel state includes at least one of the following: a CRI, a CQI, a PMI, an RI, an RSRP, an interference power level or a BWP indication. The BWP indication includes an ID of a BWP having an optimal channel state.

The active BWP is a BWP occupied by the second communication node for sending and receiving physical channel data, and the reference BWPs are inactive BWPs whose channel state the second communication node needs to report. The reference BWP includes one or more BWPs.

In this embodiment, the active BWP and the reference BWP are BWPs in the same carrier.

Figure 3:
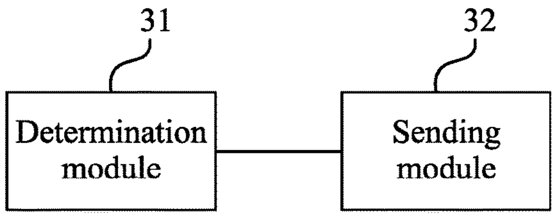
FIG. 3 is a structure diagram of an information transmission apparatus according to an embodiment of the present application.

In an example implementation, an embodiment of the present application provides an information transmission apparatus. FIG. 3 is a structure diagram of an information transmission apparatus according to an embodiment of the present application. The information transmission apparatus provided in this embodiment of the present application may be integrated into a first communication node. As shown in FIG. 3, the apparatus includes a determination module 31 and a sending module 32. The determination module 31 is configured to determine a transmission slot for a reference signal on a reference BWP.

The sending module 32 is configured to send channel state reporting indication information to a second communication node, where the channel state reporting indication information is used to trigger the second communication node to, based on the reference signals in the transmission slots, report on an uplink physical channel within an active BWP a channel state for the reference BWPs.

The reference BWPs are inactive BWPs whose channel state the second communication node needs to report.

The information transmission apparatus provided in this embodiment is configured to implement the information transmission method in the embodiment shown in FIG. 1. The implementation principles and effects of the information transmission apparatus provided in this embodiment are similar to those of the information transmission method in the embodiment shown in FIG. 1, and the details are not repeated here.

Based on the preceding embodiments, variant embodiments of the preceding embodiments are provided. It is to be noted here that for ease of description, only differences from the preceding embodiments are described in the variant embodiments.

In an embodiment, the channel state reporting indication information includes at least one of the following: a reference signal transmission delay, a channel state reporting delay, a channel state reporting period, a channel state reporting slot offset, identification information of the reference BWP or a channel state reporting mode.

In an embodiment, the apparatus further includes a reference signal delay information sending module.

The reference signal delay information sending module is configured to send reference signal delay information, where the reference signal delay information is configured for indicating a reference signal transmission delay on the reference BWP.

In an embodiment, the determination module 31 is configured to determine, according to the reference signal transmission delay, the slot index of the active BWP, a subcarrier spacing of the reference BWP, and a subcarrier spacing of the active BWP, the transmission slot for the reference signal on the reference BWP.

In an embodiment, in a case where the reference signal transmission delay on the reference BWP is $k_\Delta$ slots, a transmission slot index of the reference signal on the reference BWP is equal to $$\left\lceil \frac{\mu'}{\mu} \cdot k_0 \right\rceil + k_\Delta,$$

where μ' is the subcarrier spacing of the reference BWP, μ is the subcarrier spacing of the active BWP, and $k_0$ is a slot index on the active BWP, and the reference signal delay information is sent on the slot $k_0$.

In an embodiment, the reference signal delay information is also used for: indicating reference signal transmission delays on N reference BWPs through N*P bits.

In an embodiment, every P bits in the N*P bits from low-order bits to high-order bits indicate a reference signal transmission delay on one reference BWP, and the N*P bits indicate the N reference BWPs in descending order of BWP IDs.

In an embodiment, the configuration of the reference signal is determined by a higher-layer configuration parameter, and the configuration of the reference signal includes at least one of the following: an RSID, a period, a slot offset, a resource mapping pattern, a power offset, QCL information or reference signal SCID.

In an embodiment, a resource mapping pattern of the reference signal on the reference BWP is the same as a resource mapping pattern of a reference signal of the second communication node on the active BWP.

In an embodiment, a reference signal on a reference BWP having a reference BWP index m is configured using one of the following configurations: a reference signal configuration on the active BWP or a reference signal configuration on a reference BWP having a reference BWP index n, where n=0, 1, . . . , and N−1, n≠m, and N is the number of reference BWPs.

In an embodiment, in a case where a channel state reporting configuration of the reference BWP is periodic reporting, a reporting period is greater than or equal to the largest reference signal transmission period among reference BWPs.

In an embodiment, the apparatus further includes a reference bandwidth part range information sending module.

The reference bandwidth part range information sending module is configured to send reference BWP range information, where the reference BWP range information is used to indicate BWP IDs the reference BWPs.

The reference signal delay information sending module, the reference bandwidth part range information sending module, and the sending module may be the same module or may be different modules.

Figure 4:
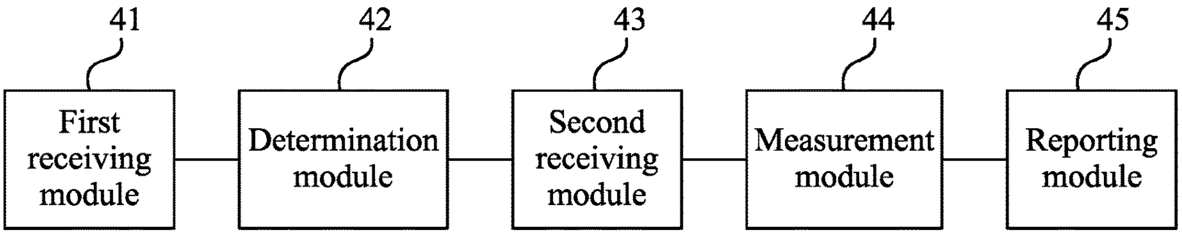
FIG. 4 is a structure diagram of another information transmission apparatus according to an embodiment of the present application.

In an example implementation, the present application provides an information transmission apparatus. FIG. 4 is a structure diagram of another information transmission apparatus according to an embodiment of the present application. The apparatus may be configured in a second communication node. As shown in FIG. 4, the apparatus includes a first receiving module 41, a determination module 42, a second receiving module 43, a measurement module 44, and a reporting module 45.

The first receiving module 41 is configured to receive channel state reporting indication information sent by a first communication node, where the channel state reporting indication information is used to trigger the second communication node to report the channel state for a reference BWP.

The determination module 42 is configured to determine a transmission slot for a reference signal on the reference BWP.

The second receiving module 43 is configured to receive the reference signals in the transmission slots.

The measurement module 44 is configured to measure, based on the reference signal, the channel state for the reference BWPs.

The reporting module 45 is configured to report the channel state for the reference BWPs on an uplink physical channel within an active BWP.

In an embodiment, the channel state reporting indication information includes one of the following: a reference signal transmission delay, a channel state reporting delay, a channel state reporting period, a channel state reporting slot offset or identification information of the reference BWP.

In an embodiment, the determination module 42 is specifically configured to: receive reference signal delay information, where the reference signal delay information is configured for indicating a reference signal transmission delay on the reference BWP; and determine, according to the reference signal delay information, the transmission slot for the reference signal on the reference BWP.

In an embodiment, the determination module 42 is specifically configured to:

determine, according to the reference signal transmission delay, a slot index of the active BWP, a subcarrier spacing of the reference BWP, and a subcarrier spacing of the active BWP, the transmission slot for the reference signal on the reference BWP.

In an embodiment, in a case where the reference signal transmission delay on the reference BWP is $k_\Delta$ slots, a transmission slot index of the reference signal is determined to be $$\left\lceil \frac{\mu'}{\mu} \cdot k_0 \right\rceil + k_\Delta,$$

where μ' denotes the subcarrier spacing of the reference BWP, μ denotes the subcarrier spacing of the active BWP, and $k_0$ denotes a slot index on the active BWP, and the reference signal delay information is sent on the slot $k_0$.

In an embodiment, before the reference signal is received in the transmission slot, the configuration of the reference signal is determined according to a higher-layer configuration parameter, where the configuration of the reference signal includes at least one of the following: an RSID, a period, a slot offset, a resource mapping pattern, a power offset, QCL information or a reference signal SCID.

In an embodiment, a resource mapping pattern of the reference signal on the reference BWP is the same as a resource mapping pattern of a reference signal of the second communication node on the active BWP.

In an embodiment, a reference signal on a reference BWP having a reference BWP index m is configured using one of the following configurations: a reference signal configuration on the active BWP or a reference signal configuration on a reference BWP having a reference BWP index n, where n=0, 1, . . . , and N−1, n≠m, and N is the number of reference BWPs.

In an embodiment, in a case where the second communication node switches from the active BWP to the reference BWP to receive the reference signal, a time interval exists between the last OFDM symbol occupied by a physical channel or physical signal configured for the second communication node on the active BWP and the first OFDM symbol occupied by the reference signal on the reference BWP.

In an embodiment, the time interval is greater than or equal to L OFDM symbols, where the value of L is determined according to a subcarrier spacing of a target BWP switched to.

In an embodiment, the value of L is determined according to the subcarrier spacing of the target BWP switched to and in the following manner: $L=A \cdot S/P$, where S represents the subcarrier spacing of the target BWP switched to, P represents the subcarrier spacing of the active BWP before the target BWP is switched to, and A is greater than or equal to 1.

In an embodiment, the apparatus further includes an optimal reporting module.

The optimal reporting module is configured to report identification information of an optimal BWP and a channel state of the optimal BWP.

The optimal BWP is a BWP having an optimal channel state among all reference BWPs; or the optimal BWP is a BWP having an optimal channel state among the reference BWP and the active BWP. The optimal reporting module and the reporting module may be the same module or may be different modules.

The information transmission apparatus provided in this embodiment is configured to implement the information transmission method in the embodiment shown in FIG. 2. The implementation principles and effects of the information transmission apparatus provided in this embodiment are similar to those of the information transmission method in the embodiment shown in FIG. 2, and the details are not repeated here.

Figure 5:
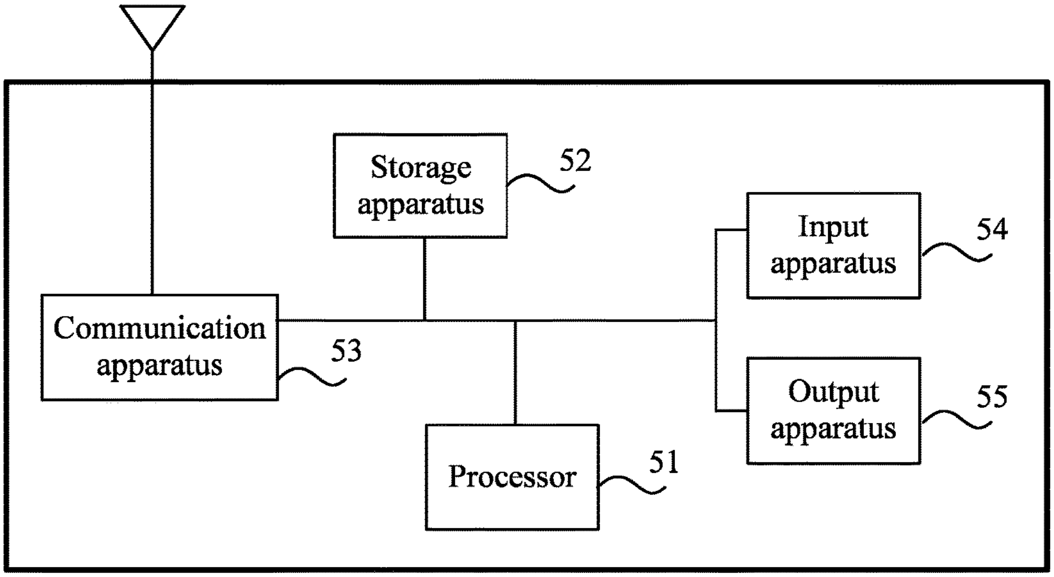
FIG. 5 is a structure diagram of a communication node according to an embodiment of the present application.

In an example implementation, the present application provides a communication node. The communication node in this example implementation includes a first communication node and a second communication node. In a case where the communication node performs the information transmission method shown in FIG. 1, the communication node may be the first communication node, and in a case where the communication node performs the transmission method shown in FIG. 2, the communication node may be the second communication node. FIG. 5 is a structure diagram of a communication node according to an embodiment of the present application. As shown in FIG. 5, the communication node provided by the present application includes one or more processors 51 and a storage apparatus 52. One or more processors 51 may be provided in the communication node, and one processor 51 is illustrated as an example in FIG. 5. The storage apparatus 52 is configured to store one or more programs, and the one or more programs are executed by the one or more processors 51 to enable the one or more processors 51 to implement the information transmission method in the embodiments of the present application.

The communication node further includes a communication apparatus 53, an input apparatus 54, and an output apparatus 55.

The processor 51, the storage apparatus 52, the communication apparatus 53, the input apparatus 54, and the output apparatus 55 in the communication node may be connected via a bus or in other manners, and the connection via a bus is illustrated as an example in FIG. 5.

The input apparatus 54 may be configured to receive input digital or character information and generate key signal input related to user settings and function control of the communication node. The output apparatus 55 may include a display device such as a display screen.

The communication apparatus 53 may include a receiver and a sender. The communication apparatus 53 is configured to perform information transceiving and communication under the control of the processor 51, where the information includes, but is not limited to, channel state reporting indication information and a channel state.

As a computer-readable storage medium, the storage apparatus 52 may be configured to store software programs, computer-executable programs, and modules such as program instructions/modules corresponding to the information transmission method in the embodiments of the present application (for example, the determination module 31 and the sending module 32 in the information transmission apparatus; for another example, the first receiving module 41, the determination module 42, the second receiving module 43, the measurement module 44, and the reporting module 45 in the information transmission apparatus). The storage apparatus 52 may include a program storage region and a data storage region, where the program storage region may store an operating system and an application program required by at least one function while the data storage region may store data created depending on the use of the communication node. Additionally, the storage apparatus 52 may include a high-speed random-access memory and may further include a non-volatile memory such as at least one magnetic disk memory device, a flash memory device or another non-volatile solid-state memory device. In some examples, the storage apparatus 52 may further include memories which are remotely disposed with respect to the processor 51. These remote memories may be connected to the communication node via a network. Examples of the preceding network include, but are not limited to, the Internet, an intranet, a local area network, a mobile communication network, and combinations thereof.

An embodiment of the present application further provides a storage medium. The storage medium is configured to store a computer program, and the computer program, when executed by a processor, implements the information transmission method in any one of the embodiments of the present application. The method, for example, is the information transmission method applied by a first communication node and the information transmission method applied by a second communication node. The information transmission method applied by the first communication node includes: transmission slots for reference signals on reference BWPs are determined, and channel state reporting indication information is sent, where the channel state reporting indication information is used to trigger the second communication node to, based on the reference signals in the transmission slots, report on an uplink physical channel within an active BWP a channel state for the reference BWPs.

The reference BWPs are inactive BWPs whose channel state the second communication node needs to report.

The information transmission method applied by the second communication node includes: channel state reporting indication information is received, where the channel state reporting indication information is used to trigger the second communication node to report the channel state for a reference BWP; a transmission slot for a reference signal on the reference BWP is determined; the reference signal is received in the transmission slot; the channel state for the reference BWPs is measured based on the reference signal; and the channel state for the reference BWPs is reported on an uplink physical channel within an active BWP.

A computer storage medium in the embodiments of the present application may adopt any combination of one or more computer-readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or element, or any combination thereof. Specific examples (non-exhaustive list) of the computer-readable storage medium include an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device, or any suitable combination thereof. The computer-readable storage medium may be any tangible medium that can contain or store a program for use by or in connection with an instruction execution system, apparatus, or device.

The computer-readable signal medium may include a propagated data signal with computer-readable program codes embodied therein, for example, in a baseband or as a part of a carrier wave. Such a propagated signal may take any of a variety of forms, including, but not limited to, electro-magnetic, optical, or any suitable combination thereof. The computer-readable signal medium may be any computer-readable medium that is not a computer-readable storage medium and that can communicate, propagate, or transport a program for use by or in connection with an instruction execution system, apparatus, or device.

The storage medium may be a non-transitory storage medium.

The program codes included on the computer-readable medium may be transmitted via any suitable medium which includes, but is not limited to, a wire, an optical cable, a radio frequency (RF), or any suitable combination thereof.

Computer program codes for performing the operations of the present application may be written in one or more programming languages or combinations thereof. The programming languages include object-oriented programming languages such as Java, Smalltalk, and C++, and further include conventional procedural programming languages such as C language or similar programming languages. The program codes may be executed entirely on a user computer, partly on a user computer, as a stand-alone software package, partly on a user computer and partly on a remote computer, or entirely on a remote computer or a server. In the case relating to a remote computer, the remote computer may be connected to the user computer through any type of network, including a local area network (LAN) or a wide area network (WAN), or may be connected to an external computer (for example, through the Internet using an Internet service provider).

The preceding are example embodiments of the present application and are not intended to limit the scope of the present application.

It is to be understood by those skilled in the art that the term user equipment covers any suitable type of wireless user devices, such as mobile phones, portable data processing apparatuses, portable web browsers or vehicle-mounted mobile stations.

In general, the various embodiments of the present application may be implemented in hardware or special-purpose circuits, software, logic or any combination thereof. For example, some aspects may be implemented in hardware while other aspects may be implemented in firmware or software that may be executed by a controller, a microprocessor, or other computing apparatuses, though the present application is not limited thereto.

The embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination thereof. Computer programs may be stored in the memory. The memory may be of any type suitable for a local technical environment and may be implemented using any suitable data storage technology, such as, but not limited to, a ROM, a RAM, and an optical memory apparatus and system (digital video disc (DVD) or compact disk (CD)). The computer-readable medium may include a non-transitory storage medium. The data processor may be of any type suitable for the local technical environment, and for example, includes, but is not limited to, a general-purpose computer, a special-purpose computer, a microprocessor, digital signal processing (DSP), an application-specific integrated circuit (ASIC), a field-programmable gate array (FPGA), and a processor based on a multi-core processor architecture.

The detailed description of example embodiments of the present application has been provided above through exemplary and non-restrictive examples. However, considering the drawings and the claims, various modifications and adjustments to the preceding embodiments are apparent to those skilled in the art without departing from the scope of the present application. Accordingly, the proper scope of the present application is determined according to the claims.

What is claimed is:

1. An information transmission method, applied by a first communication node and comprising:

determining transmission slots for reference signals on N reference bandwidth parts, wherein N≥1; and sending channel state reporting indication information to a second communication node, wherein the channel state reporting indication information is used to trigger the second communication node to, based on the reference signals in the transmission slots, report on an uplink physical channel within an active bandwidth part a channel state for the N reference bandwidth parts;

wherein the N reference bandwidth parts are inactive bandwidth parts whose channel state the second communication node needs to report;

wherein the determining the transmission slots for the reference signals on the N reference bandwidth parts comprises:

determining, according to a reference signal transmission delay, a slot index of an active bandwidth part, a subcarrier spacing of the reference bandwidth part, and a subcarrier spacing of the active bandwidth part, the transmission slots for the reference signals on the reference bandwidth parts;

wherein the first communication node transmits the reference signals in the transmission slots;

in a case where a reference signal transmission delay on a reference bandwidth part is $k_\Delta$ slots, a transmission slot index of the reference signal on the reference bandwidth part is equal to $$\left\lceil \frac{\mu'}{\mu} \cdot k_0 \right\rceil + k_\Delta,$$

wherein μ' denotes the subcarrier spacing of the reference bandwidth part, μ denotes the subcarrier spacing of the active bandwidth part, and $k_0$ denotes a slot index on the active bandwidth part, and reference signal delay information is sent on a slot $k_0$.

2. The method of claim 1, wherein the channel state reporting indication information comprises at least one of the following: a reference signal transmission delay, a channel state reporting delay, a channel state reporting period, a channel state reporting slot offset, identification information of the reference bandwidth part or a channel state reporting mode.

3. The method of claim 1, wherein the reference signal delay information is configured for indicating reference signal transmission delays on the N reference bandwidth parts through N*P bits, wherein P denotes a number of bits indicating a reference signal transmission delay on one reference bandwidth part.

4. The method of claim 3, wherein every P bits in the N*P bits from low-order bits to high-order bits indicate a reference signal transmission delay on one reference bandwidth part, and the N*P bits indicate the N reference bandwidth parts in descending order of bandwidth part identifications.

5. The method of claim 1, wherein a configuration of the reference signal is determined by a higher-layer configuration parameter, and the configuration of the reference signal comprises at least one of the following: a reference signal identification, a period, a slot offset, a resource mapping pattern, a power offset, quasi co-location information or a reference signal scrambling identification.

6. The method of claim 1, wherein a resource mapping pattern of the reference signal on the reference bandwidth part is a same as a resource mapping pattern of a reference signal of the second communication node on the active bandwidth part.

7. The method of claim 1, wherein a reference signal on a reference bandwidth part having a reference bandwidth part index m is configured using one of the following configurations: a reference signal configuration on the active bandwidth part or a reference signal configuration on a reference bandwidth part having a reference bandwidth part index n, wherein n=0, 1, . . . , and N−1, n≠m, and N denotes a number of reference bandwidth parts.

8. The method of claim 1, wherein in a case where a channel state reporting configuration of the reference bandwidth part is periodic reporting, a channel state reporting period is greater than or equal to a largest reference signal transmission period among all reference bandwidth parts.

9. The method of claim 1, further comprising:

sending reference bandwidth part range information, wherein the reference bandwidth part range information is used to indicate bandwidth part identifications in the N reference bandwidth parts.

10. A non-transitory storage medium storing a computer program, wherein the computer program, when executed by a processor, implements the method of claim 1.

11. An information transmission method, applied by a second communication node and comprising:

receiving channel state reporting indication information sent by a first communication node, wherein the channel state reporting indication information used to trigger the second communication node to report a channel state for N reference bandwidth parts, and N≥1;

determining transmission slots for reference signals on the N reference bandwidth parts;

receiving the reference signals in the transmission slots;

measuring, based on the reference signals, the channel state of the N reference bandwidth parts; and reporting the channel state for the N reference bandwidth parts on an uplink physical channel within an active bandwidth part;

wherein the N reference bandwidth parts are inactive bandwidth parts whose channel state the second communication node needs to report, and the determining the transmission slots for the reference signals on the reference bandwidth parts comprises:

determining, according to a reference signal transmission delay, a slot index of the active bandwidth part, a subcarrier spacing of the reference bandwidth part, and a subcarrier spacing of the active bandwidth part, the transmission slots for the reference signals on the reference bandwidth parts;

wherein the first communication node transmits the reference signals in the transmission slots, and the second communication node receives the reference signals in the transmission slots;

in a case where a reference signal transmission delay on a reference bandwidth part is $k_\Delta$ slots, a transmission slot index of the reference signal is determined to be $$\left\lceil \frac{\mu'}{\mu} \cdot k_0 \right\rceil + k_\Delta,$$

wherein μ' denotes the subcarrier spacing of the reference bandwidth part, μ denotes the subcarrier spacing of the active bandwidth part, $k_0$ denotes a slot index on the active bandwidth part, and reference signal delay information is sent on a slot $k_0$.

12. The method of claim 11, wherein in a case where the second communication node switches from the active bandwidth part to the reference bandwidth part to receive the reference signal, one time interval exists between a last orthogonal frequency-division multiplexing symbol occupied by a physical channel or physical signal configured for the second communication node on the active bandwidth part and a first orthogonal frequency-division multiplexing symbol occupied by the reference signal on the reference bandwidth part.

13. The method of claim 12, wherein the time interval is greater than or equal to L orthogonal frequency-division multiplexing symbols, wherein a value of L is determined according to a subcarrier spacing of a target bandwidth part switched to.

14. The method of claim 13, wherein the value of L is determined according to the subcarrier spacing of the target bandwidth part switched to and in the following manner:

$L=A\cdot S/P$, wherein

S represents the subcarrier spacing of the target bandwidth part switched to, P represents the subcarrier spacing of the active bandwidth part before the target bandwidth part is switched to, and A is greater than or equal to 1.

15. The method of claim 11, further comprising:

reporting identification information of an optimal bandwidth part and a channel state of the optimal bandwidth part;

wherein the optimal bandwidth part is a bandwidth part having an optimal channel state among the reference bandwidth parts; or the optimal bandwidth part is a bandwidth part having an optimal channel state among the reference bandwidth parts and the active bandwidth part.

16. A first communication node, comprising: one or more processors; and a storage apparatus configured to store one or more programs;

wherein the one or more programs, when executed by the one or more processors, enable the one or more processors to implement an information transmission method, wherein the information transmission method comprises:

determining transmission slots for reference signals on N reference bandwidth parts, wherein N≥1; and sending channel state reporting indication information to a second communication node, wherein the channel state reporting indication information is used to trigger the second communication node to, based on the reference signals in the transmission slots, report on an uplink physical channel within an active bandwidth part a channel state for the N reference bandwidth parts;

wherein the N reference bandwidth parts are inactive bandwidth parts whose channel state the second communication node needs to report;

wherein the determining the transmission slots for the reference signals on the N reference bandwidth parts comprises:

determining, according to a reference signal transmission delay, a slot index of an active bandwidth part, a subcarrier spacing of the reference bandwidth part, and a subcarrier spacing of the active bandwidth part, the transmission slots for the reference signals on the reference bandwidth parts;

wherein the first communication node transmits the reference signals in the transmission slots;

in a case where a reference signal transmission delay on a reference bandwidth part is $k_\Delta$ slots, a transmission slot index of the reference signal on the reference bandwidth part is equal to $$\left\lceil \frac{\mu'}{\mu} \cdot k_0 \right\rceil + k_\Delta,$$

wherein μ' denotes the subcarrier spacing of the reference bandwidth part, μ denotes the subcarrier spacing of the active bandwidth part, and $k_0$ denotes a slot index on the active bandwidth part, and reference signal delay information is sent on a slot $k_0$.

* * * * *